Figure 1:
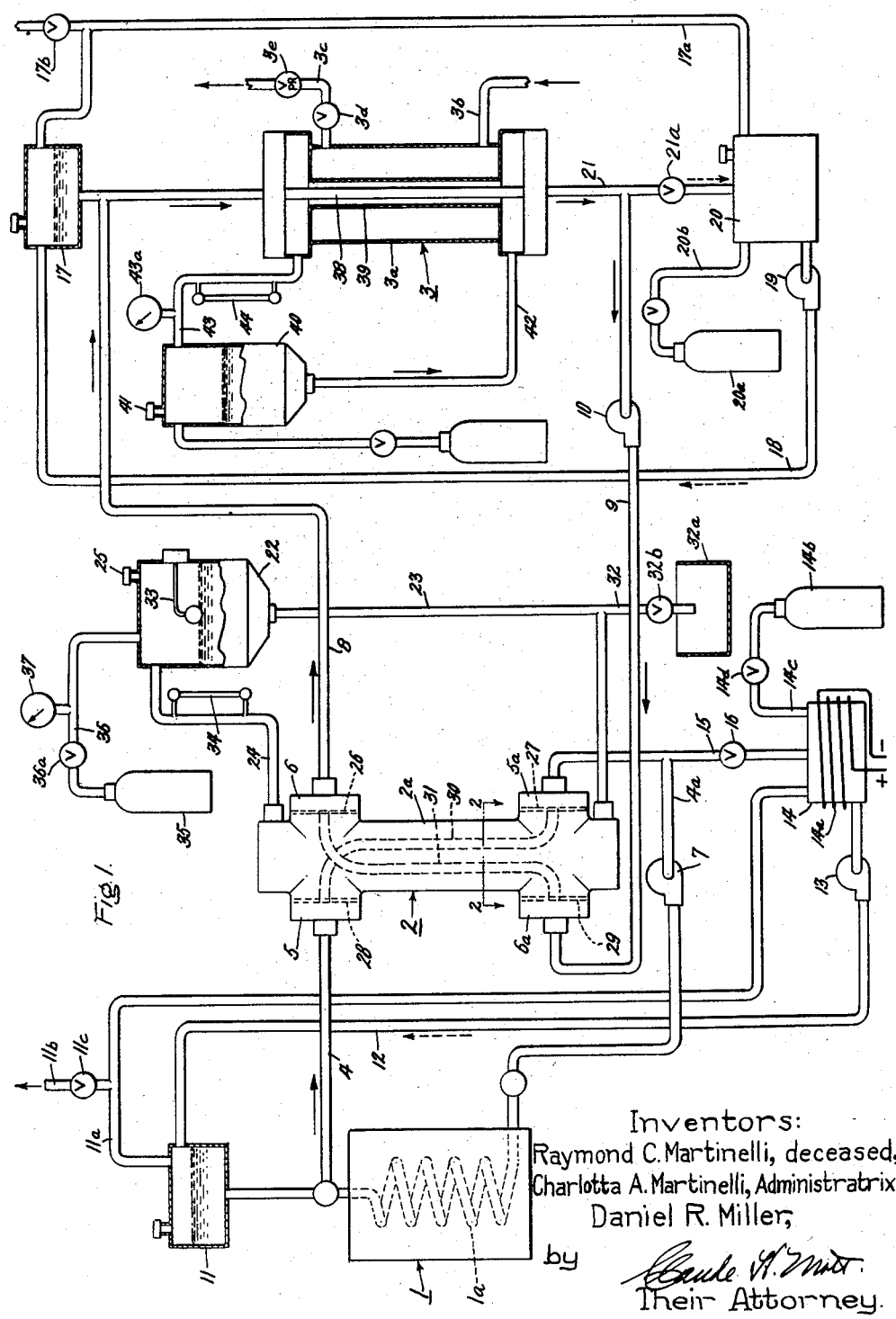

Inventors:
Raymond C. Martinelli, deceased,
Charlotta A. Martinelli, Administratrix,
Daniel R. Miller,
by
Their Attorney.

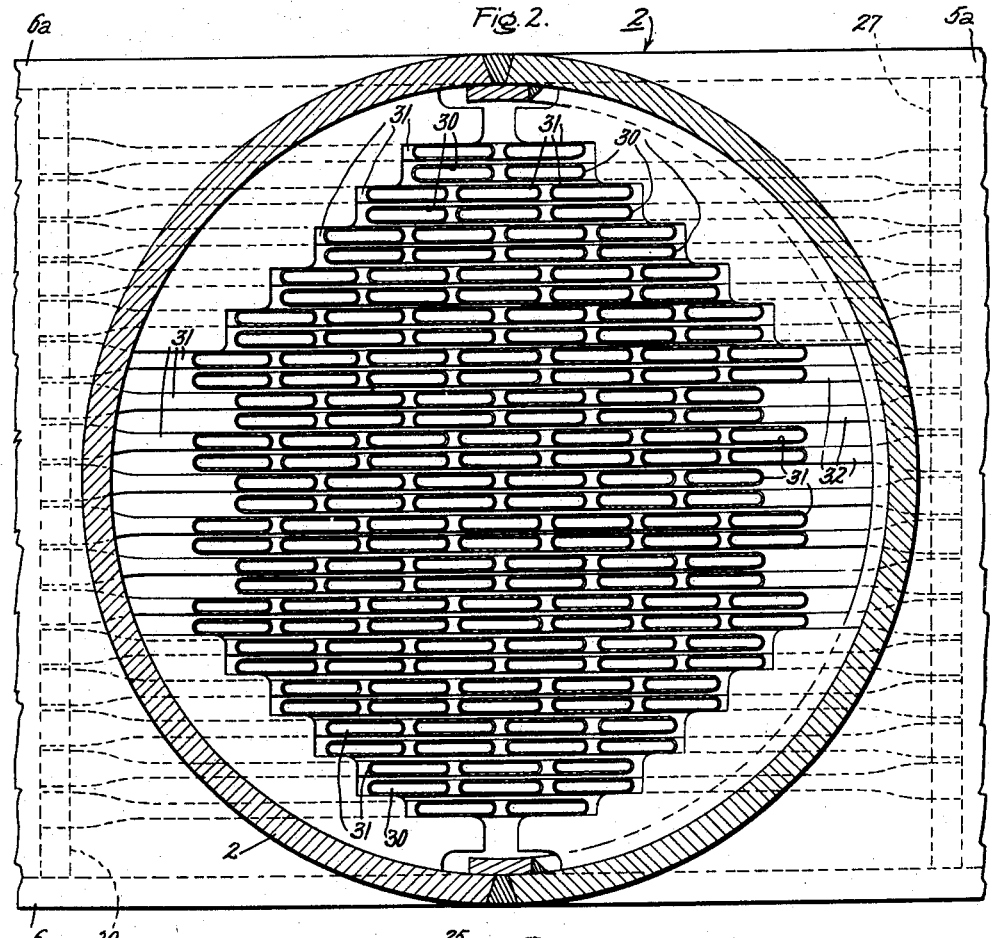
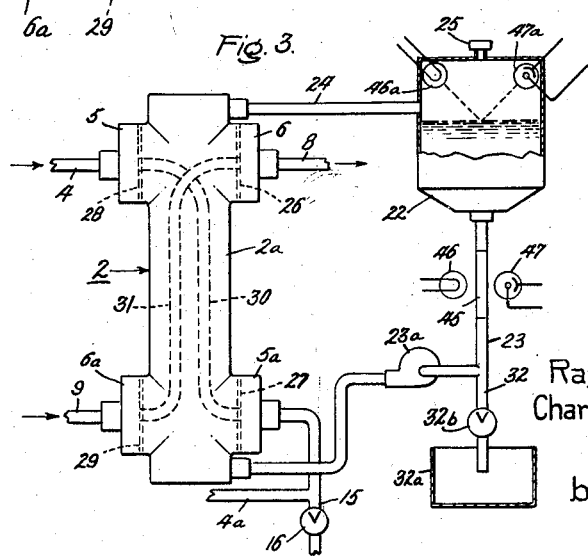

2,948,516

HEAT EXCHANGE SYSTEM WITH INTERMEDIATE HEAT CONDUCTIVE FLUIDS

Raymond C. Martinelli, deceased, late of Oakland, Calif., by Charlotta A. Martinelli, administratrix, Oakland, Calif., and Daniel R. Miller, Schenectady, N.Y., assignors to General Electric Company, a corporation of New York Original application Nov. 17, 1950, Ser. No. 196,218. Divided and this application Dec. 15, 1954, Ser. No. 475,516

6 Claims. (Cl. 257—192)

This invention relates to heat exchangers, particularly to a heat exchange system especially adapted for transferring thermal energy from a heat releasing reaction of extraordinarily high intensity concentrated in a comparatively small space, using liquid metals or molten salts thereof as the heat transfer fluid.

In previously known thermal powerplants where the heat is generated by combustion of a suitable fuel in a furnace and then transferred to a fluid such as water or mercury in boiler tubes lining the furnace wall, the "space rate" of heat release may be on the order of 250,000 B.t.u. per hour per cubic foot of furnace volume. Such furnaces as built in the past are of enormous size and represent a very substantial percentage of the total installed space ocupied by the complete powerplant. A tremendous saving in space may be made if the thermal energy can be generated in a very small reaction space and effectively extracted and transferred to other fluids, such as mercury vapor or steam serving as the motive fluid for a turbine for producing mechanical energy.

One such small size source of heat energy now being developed is the "nuclear reactor" or "atomic pile," in which the controlled decomposition and conversion of fissionable substances releases enormous quantities of heat in a very small space. Next to the matter of controlling the atomic reaction, the first major problem encountered in making use of the heat developed lies in the matter of effectively transferring the heat from the high intensity reaction to a fluid which can safely be used in conventional energy conversion devices such as steam or mercury vapor turbines. The problem is complicated enormously by the fact that any fluid which actually enters the pile becomes more or less radioactive, with the result that very heavy and expensive shielding arrangements are required to prevent radiation injury to personnel in the vicinity. In order to make such an energy conversion system practicable, it is absolutely necessary to reduce to the minimum size and complexity that part of the heat exchange cycle containing radioactive fluids and requiring such shielding. Because of the extremely dangerous character of the radioactive fluid, the stringent safety precautions required necessitate substantial departures from the design practice which has become conventional in connection with previously known powerplants.

Accordingly, the object of the present invention is to provide an improved type of heat exchange system for extracting thermal energy at a very high rate and with excellent efficiency from a high intensity thermal reaction, the heat exchanger being of the minimum practicable size and specialy arranged to reduce the possibility of contamination of one fluid by another. Generally speaking, this is accomplished by passing the hot, possibly radioactive, fluid through a primary set of conduits having metal walls of good thermal conductivity and transferring the heat to the cold fluid in a secondary set of tubes closely adjacent the respective hot tubes, with a substantially stagnant intermediate fluid of excellent heat conductivity filling the spaces surrounding and between the two sets of tubes, changes in the physical condition or characteristics of this third fluid serving to indicate the presence of a leak in one of the sets of tubes.

Other objects and advantages will be apparent from the following description, taken in connection with the accompanying drawings, in which Fig. 1 is a diagrammatic view of a heat exchange system in accordance with the invention; Fig. 2 is a cross-sectional view of one of the special heat exchangers shown in Fig. 1, taken on the plane 2—2 in Fig. 1; and Fig. 3 is a schematic view of a modified portion of the system of Fig. 1.

Referring now more particularly to Fig. 1, improved heat exchangers arranged in accordance with the present invention are shown incorporated in a complete heat exchange system comprising a suitable heat generator indicated generally at 1, an intermediate heat exchanger 2, and a steam generating heat exchanger 3. The primary liquid circuit consists of a supply pipe 4 extending from the heating coil 1a to an inlet port in an auxiliary section 5 of the intermediate heat exchanger, and a return conduit 4a adapted to return spent heating fluid from another auxiliary section 5a at the bottom of the intermediate exchanger to the heating coil 1a, the return pipe including a suitable circulating pump 7.

The secondary liquid circuit includes a supply conduit 8 for passing heated liquid from auxiliary section 6 at the top of the heat exchanger 2 to the inlet port of the steam generator 3, with a return conduit 9, including a suitable circulating pump 10 for conducting cooled liquid to the auxiliary section 6a at the bottom of heat exchanger 2.

The primary liquid circuit is provided with a closed surge tank 11 shown in the drawing as communicating with the upper heater header and having a filling conduit 12 including a suitable filling pump 13 adapted to withdraw liquid from a storage tank 14. A drain conduit 15 including a valve 16 connects the lowest point of the primary liquid circuit with the storage tank 14.

To equalize the pressure in the surge tank 11 and storage tank 14, and to provide means for venting any air remaining in the primary circuit, the pressure equalizing and venting conduit 11a connects the top portions of these two tanks. At the highest portion of the equalizing line 11a is an atmospheric vent line 11b having a manually operated valve 11c.

The secondary liquid circuit is likewise provided with a similar surge tank 17 having a filler pipe 18 with a filling pump 19, a closed storage tank 20, and a drain conduit 21 containing a valve 21a, also a pressure equalizing conduit 17a with a venting valve 17b at the highest part thereof.

The intermediate thermal conductive liquid circuit includes a supply tank 22, a supply line 23 communicating with the bottom of the heat exchange space defined between the respective tube sheets of heat exchanger 2, and a return conduit 24 communicating with the top of the heat exchange space. Make-up liquid is added to the supply tank 22 by way of the filler opening 25, and the intermediate fluid may be removed by a valved drain conduit 32 to a suitable storage tank 32a.

The heat exchanger 2 comprises generally an elongated substantially cylindrical main tank section 2a having adjacent either end thereof the opposed pairs of cylindrical auxiliary sections 5, 6, 5a, 6a, each being of a diameter substantially equal to that of the main section 2a. Spaced from the respective end walls of the auxiliary sections 5, 5a, 6, 6a are transverse tube sheets 26, 27, 28, and 29. This heat exchanger contains two sets of fluid conducting tubes, one tube of each set being indicated by dotted lines in Fig. 1. The first set, represented by the dotted line tube 30, communicates between the upper auxiliary tube sheet 28 and the lower tube sheet 27. The other set, indicated by the dotted line tube 31, is connected between the lower auxiliary tube sheet 29 and the upper tube sheet 26. Thus it will be apparent that the tube sheets 28, 27 cooperate with the respective ends of the auxiliary sections 5, 5a to define inlet and outlet chambers respectively for the hot primary liquid; while the lower auxiliary tube sheet 29 and the upper tube sheet 26 define the inlet and outlet chambers respectively for the secondary liquid.

It will also be apparent from Fig. 1 that the fluid conducting tubes 30, 31 are each of a reverse-curved or "Z-shape," having a main heat exchange section adapted to extend longitudinally of the main tank 2a, with shorter end portions curved transversely to the axis of the main tank section so as to project into the respective adjacent auxiliary sections. This arrangement permits the main axially extending portion of the tube to expand and contract lengthwise relative to the casing 2a in accordance with temperature changes, without the necessity of providing flexible expansion joints. It will also be observed that the hot fluid in the primary circuit flows through the tubes 30 in counter-flow relation with the cooler secondary fluid in the tubes 31.

It is a feature of the invention that the primary fluid is a substance which has a vapor pressure so low that no vapor will form in the primary circuit at all temperatures to be encountered in normal operation. It is therefore desirable that the boiling point of the primary fluid be substantially above the maximum normal operating temperature. For instance, if the normal temperature of the fluid leaving the heat generator 1 is in the neighborhood of 950° F., the fluid should desirably have a boiling point of perhaps 1400° F., or higher. In addition to low vapor pressure, the primary liquid should have excellent thermal conductivity, and should be of such a nature as to have small resistance to the transfer of heat from the metal heater coil 1a to the liquid. A substance which meets these requirements for the primary fluid is chemically pure metallic sodium. Since sodium melts at a temperature of 208° F., it is necessary, whenever the system is shut down, to drain the still liquid sodium through the line 15 into the storage tank 14. Then for starting, a suitable heating coil indicated at 14a in Fig. 1 may be energized to render the sodium liquid, so the filling pump 7 can return the charge of sodium from tank 14 to surge tank 11.

In order to protect this primary liquid from contamination by decomposition products resulting from contact with the oxygen or other gases in the air, a purging system for filling the primary circuit with suitable inert gas, for instance nitrogen, helium, or argon, is provided. This comprises a storage bottle of a suitable inert gas under pressure, indicated at 14b in Fig. 1, with a conduit 14c containing valve 14d and communicating with the top of storage tank 14. Since this inert purging gas is admitted at the lowest point in the system, it will force any air in the circuit upwardly and out through the atmospheric vent line 11b, regardless of whether the inert gas is heavier than air, or lighter than air like helium. Alternatively, the circuit may be evacuated of air by a suitable pump (not shown) and then filled with inert gas.

The secondary fluid may also be pure sodium, but may alternatively be a lower melting mixture of metals, such as a 50–50 mixture (by weight) of sodium and potassium. This alloy melts at 52° F. and will therefore remain liquid at ordinary room temperatures. At the same time its boiling point is in the neighborhood of 1500° F., so there will be no tendency for the secondary liquid to boil in normal operation. To protect this liquid from oxidation, an inert gas under pressure may be admitted from a bottle 20a through a valved conduit 20b to the top of reservoir 20.

The intermediate thermal conductive liquid may likewise be pure sodium; but it is important that this fluid be of such a chemical nature that it will not react violently with the primary liquid, or cause deterioration of the metal parts of the heat exchanger, or react with either of the other liquids to form solid decomposition products in the event of the leakage of the heat exchange tubes. Because none of the three fluids in the heat exchanger 2 will tend to form vapor, there will be no vapor films formed on any of the heat transfer surfaces. Thus the effectiveness of the heat transfer process is greatly improved, with the result that the size of the exchanger may be reduced, for a given heat transfer capacity, as compared with more conventional heat exchangers when heat is transferred to or from a volatile liquid.

When used in connection with an atomic pile, the primary fluid will commonly become sufficiently radioactive to require shielding for protection of personnel, but with proper design of the atomic pile and use of suitable fluids the radiations emitted by the primary fluid will not render the intermediate and secondary fluids radioactive in the absence or failure of barriers in the atomic pile. Therefore, there is little or no danger that the secondary fluid will become radioactive merely by passing through the intermediate heat exchanger 2, unless there is actual leakage from the primary circuit into the intermediate fluid and thence into the secondary circuit. It therefore becomes essential that means be provided for immediately detecting leakage of the radioactive primary liquid into the intermediate fluid. In that event, the system can be immediately stopped, or the operation thereof modified, before any radio-active material can leak into the secondary circuit from the intermediate fluid.

In order to detect changes in the condition of the intermediate fluid symptomatic of this dangerous leakage from the primary circuit, the intermediate circuit includes suitable devices for indicating changes in the condition of the heat conductive intermediate liquid. These may include a suitable type of float level indicator shown at 33, or any known type of equivalent electrical or electromagnetic level indicator, as shown at 34, since any equivalent means may be used for instantaneously detecting any smallest change in the quantity of liquid in the secondary circuit. Such a change in level would of course indicate that leakage was occurring, either into or out of the intermediate fluid circuit, which would constitute a warning that the primary or secondary tubes 30, 31 might be leaking.

The intermediate liquid circuit may be maintained at a preselected pressure by means of a gas pressurizing system consisting of a suitable source of an inert gas, such as nitrogen under pressure, indicated diagrammatically as being a storage bottle 35 connected by a valved conduit 36 to the top of storage tank 22. A suitable pressure gage 37 measures the static gas pressure on the intermediate fluid. In operation, inert gas is admitted past the shut-off valve 36a to the tank 22 from the reservoir 35, until the pressure gage 37 indicates a desired pressure, after which the valve 36a is closed. If then any substantial change in the quantity of liquid in the intermediate circuit should occur, gage 37 will register a change in gas pressure, and the liquid level indicators 33, 34 will directly show the change in level.

The structural details of the intermediate heat exchanger 2 may be seen in Figs. 1 and 2. It will be noted that the tube sheets 26, 27, 28, and 29 are welded into the respective auxiliary sections 6, 5a, 5, and 6a. The heat exchange tubes are secured by welding directly to the tube sheets, so as to substantially eliminate the possibility of leakage of either the hot or cold fluids into the intermediate fluid. Each heat exchange tube may have a reduced end portion of circular section for convenient welding into the tube sheet, while the intermediate or main heat exchange portion of the tube is considerably flattened in cross section to provide a comparatively wide and thin flow path. The cross section of these flattened heat exchange portions of the tubes may be seen in Fig. 2. It will be apparent from the drawing that each cold tube 31 is directly adjacent and parallel to a corresponding hot tube 30, the transverse spacing between tubes being kept to the absolute minimum necessary to prevent mechanical contact as the tubes expand and contract due to differential thermal expansion between the tubes and expansion of the tubes relative to the tank. This transverse spacing between hot and cold tubes may be on the order of .01 inch. The ability of the individual tubes to expand freely relative to each other and to the tank insures that there will be no excessive deflections or stresses created in any tube; and this desirable condition is obtained without the use of potentially troublesome conventional types of expansion joints. It is to be noted that nowhere in the design of this heat exchanger are there any flexible bellows, slip-type expansion joints, or other potential sources of mechanical failure. On the contrary, the simplicity of the design permits secure welding of all joints in order to eliminate to the greatest possible extent any chance of contamination of one fluid by the other.

The steam generator is indicated generally at 3 in Fig. 1, and for the sake of simplicity is represented as having only a single hot fluid conducting tube 38 surrounded by a radially spaced coaxial tube 39. Water is supplied from a suitable source (not shown) through an inlet 3b at the lower end of casing 3a and steam is taken from outlet 3c having a manual shut-off valve 3d and an automatic pressure-regulating valve 3e. It will be understood that the steam generator actually has a large number of tubes in parallel flow relation corresponding to tube 38 and containing the hot fluid received through supply conduit 8 from intermediate exchanger 2. The annular space between the inner conduit 38 and the coaxial conduit 39 is filed with another intermediate heat conductive liquid, which may conveniently be mercury, the pressures at this part of the cycle being high enough to prevent the mercury from vaporizing at the temperatures existing in the system. The supply system for the mercury includes a tank 40, having a filler vent 41, a supply line 42 communicating with the annular space between conduits 38, 39 at the lower end thereof, and a vent line 43 communicating with the upper end of this annular space and serving to return any overflow to reservoir 40. A suitable sight gage 44, or equivalent level indicating device, or a pressure gage 43a may be provided. It will be apparent that the arrangement of this intermediate liquid circuit is very similar to that described in connection with the sodium filled circuit including the tank 22. Here the purpose of the mercury is to insure that the sodium (or sodium-potassium mixture) constituting the secondary fluid will not come in contact with any water, which would produce a violently explosive reaction.

Since the steam, taken from the conduit 3c may be used as the motive fluid in a turbine powerplant, the pressure of the steam in the generator tank 3a may be on the order of several hundred pounds per square inch, as required for operating a steam turbine. On the other hand, the pressure in the secondary circuit 8, 9 is substantially the hydraulic pressure due to the height of the column of liquid therein, as modified by the pressure generated by pump 10 in order to effectively circulate the secondary liquid, and as modified further as may be desired by controlling the admission of inert gas from tank 20a. Thus the maximum pressure anywhere in the secondary circuit may be only on the order of 45 lbs./square inch. Likewise, the pressure of the intermediate liquid in the circuit 42, 43 is substantially that resulting from the hydrostatic head of the liquid in that circuit. Thus it will be apparent that the steam pressure in the generator 3 is much greater than the pressure of the other two fluids therein, while the pressure of the secondary fluid may be regulated to be greater or less than that of the intermediate fluid. Thus it will be apparent that leakage in the tube 39 will result in water being admitted into the intermediate mercury circuit.

Any leak in the tube 39 will result in a change in the gage 44, this change in level being taken as an indication of such leakage so that the system can be inspected or shut down before any sodium or potassium within the conduit 38 can contact water in tank 3a. Similarly, a leak in the conduit 38 will produce a change in level which can be detected and the fault corrected before any sodium-potassium mixture can contact water in casing 3a.

In connection with the leak detection functions of the intermediate thermal conductive liquids in the tanks 22, 40, it should be observed that many equivalent arrangements may be employed to detect the presence of leakage fluid. For instance, in Fig. 3 is shown a modification of the intermediate fluid circuit for the heat exchanger 2. In this modification, the liquid supply conduit 23 contains a transparent portion shown at 45 and having an adjacent light source 46 adapted to project a beam of light through the transparent conduit section onto a photo-cell 47. If then the primary liquid is colored or otherwise "coded" with some additive, any change in characteristics of the intermediate liquid due to leakage of the primary liquid will cause a change in the light transmission or other physical characteristics of the fluid in the transparent conduit section 45, with a resulting change in the output of the photo-cell 47. Thus the electrical signal from photo-cell 47 may be used to indicate the existence of a leak.

The use of the transparent conduit section 45 in the optical detector system 46, 47 as disclosed in Fig. 3 is of course limited to those cases where the first intermediate liquid is at least somewhat transparent. On the other hand, where this liquid is mercury or some other opaque liquid, a somewhat different arrangement may be employed. For instance, a light source 46a may be associated with the reservoir 22 so as to project a light beam onto the surface of the liquid in tank 22, the reflected light being picked up by the photocell 47a. Such an arrangement may be sensitive to the color of the liquid in the tank 22, or to changes in the characteristics of the vapor above the liquid in tank 22.

Also, the optical detecting system 45, 46, 47 might be replaced by a suitable equivalent instrument such as the well-known "Geiger counter," widely used to detect emanations from radio-active substances. This would readily signal the presence of even minute quantities of the dangerously radio-active primary fluid in the intermediate liquid circuit.

It is of course also feasible to merely have an operator periodically draw off a sample of the secondary liquid by manually operating the drain valve 32b. A suitable chemical or physical test of the sample can readily be devised to ascertain whether any of the primary liquid has contaminated the intermediate liquid.

The method of operating the system described above may be as follows.

Assume that the system is inoperative, with the charge of primary liquid contained in the storage tank 14, the secondary liquid charge in the storage tank 20, and the two intermediate liquid circuits filled to the level indicated in Fig. 1, atmospheric pressure prevailing throughout the system.

Since the sodium in the primary circuit freezes at a temperature of 208° F., the storage tank 14 must be heated, as by energizing the electric heating coil 14a; and all the piping and other components comprising the primary circuit must be pre-heated, by suitable electric heating coils or the equivalent (not shown) before the primary circuit can be charged to its operating condition. In order to purge the primary circuit of all air, inert gas is admitted from the storage bottle 14b by opening the valve 14d; and the atmospheric vent valve 11c is opened so that air is bled from the primary circuit at the highest point thereof. Here also, a vacuum pump may be employed to remove the air. After all air is expelled and the primary circuit is completely charged with inert gas, the atmospheric vent 11c and the gas supply valve 14d are closed. The heat generator 1, or some auxiliary source of heat such as a gas or oil-fired heater or electric heating coil (not shown), may be employed to supply heat to the inert gas in the primary circuit, while the pump 7 causes this gas to circulate. Such circulation of heated gas may be employed to pre-heat all parts of the primary circuit.

After being suitably pre-heated, the primary circuit is charged with its operating liquid by energizing the fill pump 13. After the desired quantity of liquid is charged into the circuit, the valve 14d may be further adjusted until the pressure in the primary circuit is at a desired, comparatively low, value, for instance on the order of 20 lbs./sq. inch gage.

With the primary circuit charged and the heat generator 1 operating at its lowest "no load" rate, the pump 7 will effect circulation through the heater to keep the sodium in a liquid state and bring all parts of the primary circuit up to a temperature in the neighborhood of 300° F.

To expel all air from the first intermediate circuit, it may be evacuated, or the filler cap 25 may be removed from tank 22 and inert gas admitted by opening the valve 36a to expel any air in the storage tank 22. Then the cap 25 is replaced and the valve 36a regulated until the inert gas pressure in this intermediate circuit is at a desired value, for instance about 5 to 10 lbs./sq. inch gage, as indicated by pressure gage 37. Valve 36a is then closed, and opened thereafter only as may be necessary to readjust the pressure in the circuit. Ordinarily this intermediate liquid circuit is a closed system for the life of the plant, the drain line 32, filler cap 25, and the gas supply line 36 being opened only when unusual circumstances require. If for instance it should become necessary to drain the entire charge of intermediate liquid, the circuit would be re-filled by introducing pre-heated sodium through the filler opening 25, during which process inert gas would be admitted through pipe 36 to prevent the entrance of air from the atmosphere.

The intermediate liquid circuit may be so designed that there will be some thermal circulation of the intermediate fluid, sufficient to maintain the sodium charge liquid in all parts of that circuit. Or auxiliary heating means (not shown) may be employed to insure that this charge will remain liquid. The above-described "no-load" operation of the primary circuit will thus deliver enough heat to the intermediate circuit to keep the sodium charge liquid.

Before filling the secondary circuit 8, 9 with sodium-potassium alloy from storage tank 20, it is evacuated to remove air therefrom, or the atmospheric vent valve 17b is opened and inert gas admitted to tank 20 from the bottle 20a, so that all the air is expelled from the secondary circuit through the atmospheric vent, which is then closed. When this has been effected, the fill pump 19 may be energized and the sodium-potassium charge removed from tank 20 and elevated to the surge tank 17. The supply of inert gas to tank 20 is continued only until the gas pressure in the secondary circuit is on the order of 5 to 10 lbs./sq. inch, just enough to prevent any infiltration of air.

The "no-load" operation of the primary circuit will serve to heat the sodium-potassium alloy in the secondary circuit. Ordinarily, this secondary liquid will be already liquid, since it melts at about 52° F. The pump 10 may therefore be started to circulate the secondary liquid and bring all parts of that circuit up to the "idling" temperature, in the neighborhood of 300° F.

The maximum pressure in the secondary circuit 8, 9 is substantially the discharge pressure produced by the circulating pump 10, which may be on the order of 45 lbs./sq. inch gage.

Preparatory to operation of the steam generator 3, the other intermediate fluid circuit 42, 43, must be purged and pressurized with inert gas from the reservoir 40a as controlled by the manual valve 40b. This purging and pressurizing operation is similar to that described above in connection with the first intermediate circuit 23, 24. Here, however, the supply of inert gas is continued until the intermediate fluid pressure in the circuit 42, 43 is in the neighborhood of 150 lbs./sq. inch gage.

The steam generator 3 is now filled with water through inlet conduit 3b, preferably preheated to about 180° F.

The "no-load" circulation of the secondary liquid will now generate steam in the heat exchanger 3, and the supply of water through conduit 3b and the discharge of steam through conduit 3c will be regulated so that the steam pressure in generator 3 remains in the neighborhood of 100 lbs./sq. inch, as determined by the pressure regulating valve 3e. The rate of circulation in the secondary circuit is so adjusted, as by changing the speed of the pump 10, that the secondary liquid entering the steam generator will remain at a temperature of about 300° F.

The entire system is now operating at "idling" or no-load condition. If now the heat release rate in the generator 1 is increased, the temperature of the primary and secondary liquids and the steam pressure in generator 3 will tend to increase. The temperatures of both the primary and secondary liquids can be controlled somewhat by altering the speed of the circulating pumps. Thus by controlling the heat release rate in heater 1, the speed of the circulating pumps 7, 10, and the setting of the pressure regulating valve 3e on the steam generator, the temperature of the whole system may be caused to gradually rise to the normal design operating conditions. For instance, the temperature at the outlet of heater 1 may be increased to a value on the order of about 500° F., during which the rate at which steam is withdrawn from generator 3 may be decreased by changing the setting of the regulating valve 3e so that the steam outlet pressure increases to about 300 to 450 lbs./sq. inch, the normal operating value. Now the outlet temperature at heater 1 may be increased still further to a normal operating value in the neighborhood of 950° F., the steam discharge rate being increased by the regulating valve 3e so as to hold steam pressure constant at the normal operating value.

The entire system is now in normal operation, and the heat release rate in the generator 1 may be controlled, manually or by suitable automatic control devices, to vary the steam delivery rate in accordance with the requirements of the turbine or other consumer, while valve 3e keeps the steam supply pressure constant.

The invention provides an exceptionally efficient heat exchange system for extracting thermal energy from high intensity reactions with safeguards for making absolutely sure that the dangerous primary fluid cannot leak from its closed circuit, so as to contaminate the other normally safe fluids used in the system to convey thermal energy to the ultimate consumer.

The system described herein is particularly advantageous because the dangerous fluid is confined to a comparatively simple circuit which may be readily contained within the shielding of the atomic pile. Furthermore the highest temperature part of the system, the primary circuit, operates at an extremely low pressure, only on the order of 20 lbs./sq. inch, with the result that the primary circuit and intermediate heat exchanger 2 become comparatively simple to design from the standpoint of mechanical strength. At the same time, the intermediate heat exchanger 2 is so efficient that its size may be reduced so that it may also be included within the shielding of the atomic reactor proper.

It will be apparent to those skilled in the heat exchanger art that the invention lends itself to an enormous number of alternate arrangements. For instance, while the inert gas purging and pressurizing systems have been described as having manually controlled valves, it will be obvious that suitable automatic control arrangements may be employed to bleed or admit inert gas as required to hold the pressures in the respective circuits at any preselected value. Also, the mechanical details of the intermediate heat exchanger 2 and steam generator 3 may be considerably varied, and heat exchange fluids other than those specifically mentioned herein may be used.

This application is a division of application Serial No. 196,218, filed November 17, 1950, by Raymond C. Martinelli, deceased, Charlotta A. Martinelli, administratrix, Stephen W. Akin, Daniel R. Miller, David B. Nelson and John D. Selby, now abandoned.

It is of course intended to cover by the appended claims all such modifications and changes as fall within the true spirit and scope of the invention.

What is claimed as new and desired to be secured by Letters Patent of the United States is:

1. The method of indirectly transferring heat from a first fluid to a second fluid and detecting leakage of either of said fluids, which comprises introducing a liquid having suitable heat transfer qualities into a closed independent path completely within one of the fluids and completely surrounding the other of said fluids, whereby the desired heat transfer from the first fluid to the second fluid is through the liquid, and employing said liquid to indicate leakage thereto of one of said fluids.

2. The method of indirectly transferring heat from a first fluid to a second fluid and detecting leakage of either of said fluids, which comprises introducing a third fluid having suitable heat transfer qualities into an independent path separating said first and second fluids, whereby the desired heat transfer from the first fluid to the second fluid is through said third fluid, and employing said third fluid to indicate leakage thereto of the first or second fluid.

3. In heat exchange apparatus having a casing with two separate sets of fluid inlets and outlets with a first hot fluid conduit defining a portion of a closed primary circuit and extending from one inlet to a corresponding outlet and a second colder fluid conduit defining a portion of a closed secondary circuit and extending from another inlet to a corresponding outlet, the space within the casing and surrounding said conduits being filled with a liquid of good thermal conductivity, the combination of means for maintaining the intermediate thermal conductive liquid at a pressure different from that of the hot and cold fluids, and means for detecting changes in the condition of the intermediate thermal conductive fluid for indicating the existence of a leak in the heat exchange conduit walls.

4. Heat exchange apparatus in accordance with claim 3 in which the condition detecting means comprises pressure-responsive means for detecting changes in the pressure of the intermediate liquid accompanying leakage between the heat exchange conduits and the intermediate liquid.

5. Heat exchange apparatus comprising means defining a first passage adapted to contain a first fluid means defining a second passage adapted to contain a second fluid, said first and second passages being separated by a space and being adapted to contain a third fluid in said space so as to be in heat exchange relation with both said first and said second fluids, and leak detection means for indicating leakage into the third fluid when said heat exchange apparatus is charged with three fluids.

6. A heat exchange system especially adapted for safely transferring thermal energy between fluids which are subject to violent reaction upon contact with each other, comprising means defining a first passage adapted to receive a first fluid, means defining a second passage adapted to receive a second fluid, said first and second passages being separated by a space and being adapted to contain a third fluid in said space so as to be in heat exchange relation with both said first and said second fluids, the geometrical arrangement of both of said means being such as to insure that leakage within the heat exchange system from either the first fluid or the second fluid will be into said space, and leak detection means for indicating leakage into the third fluid when said heat exchange system is charged with three fluids, whereby said first and second fluids are prevented from coming into contact and producing a violently explosive reaction.

References Cited in the file of this patent

UNITED STATES PATENTS

| | | |
|---|---|---|
| 1,747,070 | Grafflin | Feb. 11, 1930 |
| 2,103,947 | Holmes | Dec. 28, 1937 |
| 2,658,728 | Evans | Nov. 10, 1943 |